(No Model.)
A. W. OBERMANN.
COOKING UTENSIL.
No. 487,291. Patented Dec. 6, 1892.
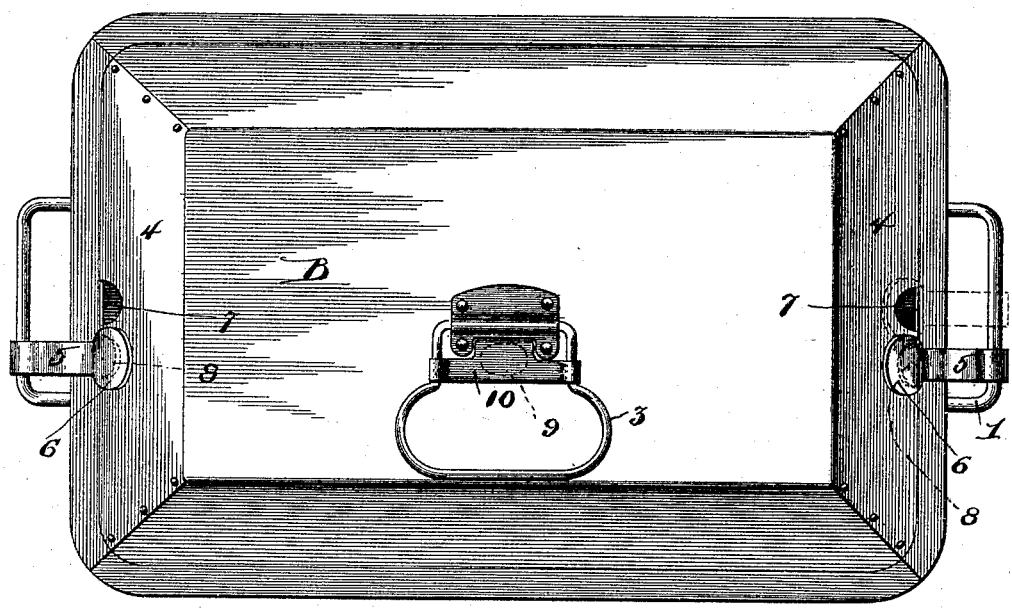
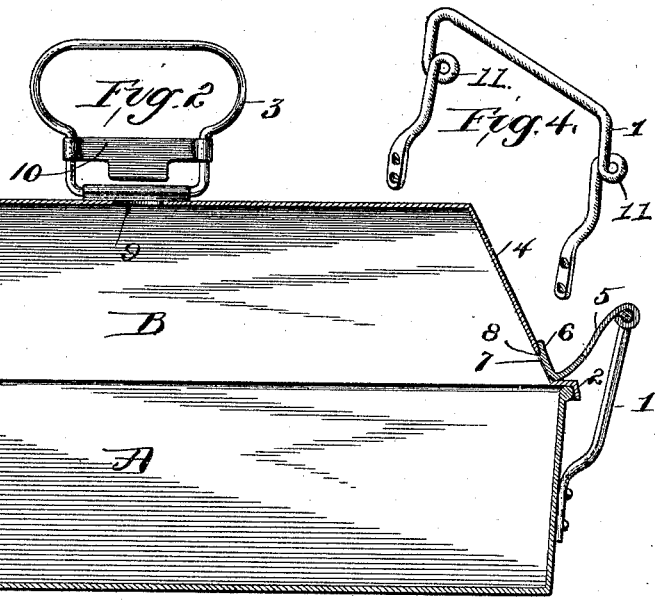
Witnesses:  Inventor.
  August W. Obermann
  By Lotz & Kennedy, Attys.

UNITED STATES PATENT OFFICE.

AUGUST W. OBERMANN, OF PITTSBURG, PENNSYLVANIA.

COOKING UTENSIL.

SPECIFICATION forming part of Letters Patent No. 487,291, dated December 6, 1892.

Application filed October 12, 1891. Serial No. 408,488. (No model.)

*To all whom it may concern:*

Be it known that I, AUGUST W. OBERMANN, a citizen of the United States, residing at Pittsburg in the county of Allegheny and State of Pennsylvania, have invented certain new and useful Improvements in Cooking Utensils; and I do hereby declare the following to be a full, clear, and exact description of the invention, such as will enable others skilled in the art to which it appertains to make and use the same.

This invention relates to a novel construction in a cooking utensil, and more particularly to a device for roasting meats and the like, the object being to provide a device of this character that is simple and durable in construction and efficient in operation.

The invention consists in the features of construction hereinafter fully described and specifically claimed.

In the accompanying drawings, illustrating my invention, Figure 1 is a top plan view of a device constructed in accordance with my invention. Fig. 2 is a vertical longitudinal section. Fig. 3 is a perspective view of one of the swinging clamping-dogs. Fig. 4 is a perspective view of a modified form of construction embodying my invention.

Referring to said drawings, A indicates a pan of familiar construction provided with the upwardly-projecting handles 1 at the ends thereof. It is manifest that such pan can be used in the ordinary manner. B is a cover for said pan, and said cover is provided with a flange 2, that surrounds the outer edge thereof and holds the cover in position. Said cover is also provided with an ordinary swinging handle 3. The said cover B is provided with the inclined end pieces 4, and swinging dogs 5, having bent ends 6, are secured to the pan, conveniently upon the lateral projections or handles 1, as shown, which lateral projections or handles extend upward above the upper edge of the pan, so that the swinging dogs that are pivoted thereto have their pivots located above the upper edge of the pan, whereby the free ends of such swinging dogs can be brought down upon the inclined sides of the cover to hold the cover upon the pan in an obvious manner. When it is desired to secure the cover upon the pan, the said swinging dogs 5 are thrown over and forced down upon the end pieces 4, so that the bent ends 6 of said dogs are jammed against said end pieces. The handles 1 possess sufficient flexibility to permit the dogs to be forced into this position, and to hold the same rigidly, as shown in Figs. 1 and 2. When in this position, the pan and contents can be lifted and carried by means of the handle 3 on the cover.

As a further and separate improvement I have provided means for regulating the cooking of the meat. For instance, in roasting meats, if the cover is kept secured upon the pan the meat will be thoroughly cooked, but will not be browned, and to accomplish this end the cover is provided with openings that can be closed or opened at will. It will of course be understood that various means can be employed for opening and closing such openings; but as a convenient and desirable construction the openings are made in the ends 4 of the cover, as shown at 7, and are located in position to be covered by the ends 6 of the dogs when the latter are forced down upon the cover. It will be obvious that this provides a convenient and inexpensive way in which to close said openings, as it avoids the employment of other parts. It will be noted that, as shown in Figs. 1 and 2, the swinging dogs in securing the cover can either close the openings or not, as found desirable. As a further improvement in said dogs 5, I have provided shoulders 8 on the rear face of the ends 6 thereof, and said shoulders 8 are adapted to enter the openings $g$, as shown in Fig. 2, thus affording a rigid connection between such parts, and also making a tight joint. The cover is also provided with another opening 9 in the top thereof and adjacent the handle 3, and said handle is provided with a plate 10, that covers said opening 9 when said handle is down upon the cover.

As a further and separate improvement I have shown in Fig. 4 a construction of the handle 1 that posesses the requisite strength and at the same time is flexible enough to bend when the clamping-dogs are locked and unlocked. To this end the side pieces of said handles are provided with the bends 11.

I claim as my invention—

1. A cooking utensil comprising a pan having lateral projections extending above the upper edge thereof and vertically-swinging clamping-dogs secured to said projections above the upper edge of the pan and adapted to engage and hold a cover thereon.

2. A cooking utensil comprising a pan and vertically-swinging clamping-dogs secured to handles upon said pan and adapted to engage and hold a cover thereon.

3. A cooking utensil comprising a pan and swinging clamping-dogs 5, having bent ends 6 secured to said pan, said bent ends being adapted to engage and hold a cover upon said pan.

4. A cooking utensil comprising a pan, a cover therefor having openings therein, and swinging clamping-dogs secured to said pan and adapted to engage and hold said cover thereon and located in position to cover said openings.

5. A cooking utensil comprising a pan, a cover therefor, having openings therein, and swinging clamping-dogs secured to said pan and provided with shoulders, said dogs being adapted to engage and hold said cover upon the pan and located so that said shoulders enter the said openings.

6. A cover for a cooking utensil, having a swinging handle 3, provided with a plate 10, and an opening 9 in said cover adjacent said handle and adapted to be closed by said plate.

7. A cooking utensil comprising a pan and swinging clamping-dogs secured to flexible projections upon said pan and adapted to engage and hold a cover thereon.

8. A cooking utensil comprising a pan and swinging clamping-dogs secured to projections upon said pan and adapted to engage and hold a cover thereon, the side pieces of said projections having bends 11.

9. A cooking utensil comprising a pan and swinging clamping-dogs secured to flexible handles upon said pan and adapted to engage and hold the cover thereon.

10. A cooking utensil comprising a pan and swinging clamping-dog secured to handles upon said pan and adapted to engage and hold the cover thereon, the side pieces of said handles having spring-bends 11.

In testimony whereof I affix my signature in presence of two witnesses.

AUGUST W. OBERMANN.

Witnesses:
R. C. OEHMLE,
AUG. OLINGER.